(12) United States Patent
Kawamura et al.

(10) Patent No.: US 6,394,535 B1
(45) Date of Patent: *May 28, 2002

(54) VEHICLE OCCUPANT PROTECTION SYSTEM

(75) Inventors: Yasushi Kawamura; Takahiro Kamei, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/608,669

(22) Filed: Jun. 30, 2000

(30) Foreign Application Priority Data

Jul. 5, 1999 (JP) ............................................. 11-190659

(51) Int. Cl.$^7$ ............................. B60R 21/02; B60N 2/02
(52) U.S. Cl. ................... 296/189; 296/68.1; 297/216.1; 297/216.18
(58) Field of Search ............................. 296/68.1, 65.02, 296/188, 189; 297/216.1, 216.16, 216.13, 216.18

(56) References Cited

U.S. PATENT DOCUMENTS

| | | | |
|---|---|---|---|
| 2,959,446 A | 11/1960 | Thompson | 296/68.1 |
| 3,001,815 A | 9/1961 | Weber | 296/68.1 |
| 3,732,944 A | 5/1973 | Kendall | 180/274 |
| 3,897,101 A | 7/1975 | Hess | 296/68.1 |
| 3,961,805 A | 6/1976 | Satzinger | 280/805 |

(List continued on next page.)

FOREIGN PATENT DOCUMENTS

| | | |
|---|---|---|
| DE | 3424-928 A | 1/1986 |
| DE | 4323543 C | 10/1994 |
| DE | 4415467 C1 | 11/1995 |
| DE | 19938940 A | 3/2000 |
| GB | 1043695 | 9/1966 |
| GB | 2 340 801 A | 3/2000 |
| GB | 2340802 A | 3/2000 |
| JP | 5-238287 | 9/1993 |

(List continued on next page.)

OTHER PUBLICATIONS

Patent Abstracts of Japan, JP07101354A, http://www.patents.ibm.com/cgi–bin/viewpat.cmd /JP07101354A2, JPO, 1995.
Patent Abstracts of Japan. JP2000062556, 2001 http://www1/ipdl.jpo.go.jp/PA1/cgi–bin/PAINDEX.

*Primary Examiner*—D. Glenn Dayoan
*Assistant Examiner*—Patricia Engle

(57) ABSTRACT

The vehicle occupant protection system can significantly reduce the peak deceleration of the vehicle occupant even with a small vehicle body. The system comprises a seat supported on a vehicle body so as to be slidable in a direction of an input crash load resulting from a vehicle crash; a first member connected to the seat and adapted to deform under the crash load upon occurrence of a vehicle crash; a second member connected to a main part of the vehicle body and adapted to deform under the crash load; and a power actuator for applying a forward force to the seat relative to the vehicle body with a certain time delay after the occurrence of the vehicle crash; the first member being adapted to substantially deform only after the forward force is applied to the seat upon occurrence of a vehicle crash. Thus, in case of a vehicle crash or other high deceleration situations, the seat is accelerated rearward upon the occurrence of a vehicle crash by the first member resisting deformation while the second member deforms so that the restraining capability of the seat belt is enhanced. Thereafter, an acceleration in the opposite direction is applied to the seat by the application of the forward force to the seat relative to the vehicle body so that the equalization of the decelerations of the vehicle body and the vehicle occupant is achieved in an early stage of the crash.

8 Claims, 6 Drawing Sheets

U.S. PATENT DOCUMENTS

| | | | |
|---|---|---|---|
| 3,992,046 A | 11/1976 | Braess | 296/65 A |
| 3,998,291 A | 12/1976 | Davis | 180/91 |
| 4,156,472 A | 5/1979 | Kunz | 177/24.13 |
| 4,832,409 A | 5/1989 | Borlinghaus et al. | 297/468 |
| 4,881,781 A | 11/1989 | Borlinghaus et al. | 297/473 |
| 5,167,421 A | 12/1992 | Yunzhao | 297/216.18 |
| 5,286,085 A | 2/1994 | Minami | 297/250.1 |
| 5,409,262 A | 4/1995 | McLennan | 280/784 |
| 5,437,494 A | 8/1995 | Beauvais | 297/216.19 |
| 5,626,203 A | 5/1997 | Habib | 180/274 |
| 5,636,424 A | 6/1997 | Singer et al. | 29/407.01 |
| 5,681,057 A | 10/1997 | Whirley et al. | 280/784 |
| 5,685,603 A | 11/1997 | Lane, Jr. | 297/216.11 |
| 5,746,467 A | 5/1998 | Jesdanont | 296/68.1 |
| 5,810,417 A | 9/1998 | Jesdanont | 296/68.1 |
| 5,947,543 A * | 9/1999 | Hubbard | 296/68.1 |
| 6,003,937 A | 12/1999 | Dutton et al. | 297/216.1 |
| 6,042,190 A | 3/2000 | Mathe et al. | 297/483 |
| 6,092,853 A * | 7/2000 | Hubbard | 296/68.1 |
| 6,116,561 A | 9/2000 | Christopher | 248/429 |
| 6,170,865 B1 | 1/2001 | Barron | 280/735 |
| 6,193,296 B1 | 2/2001 | Motozawa et al. | 296/68.1 |
| 2,227,563 A1 | 5/2001 | Talisman | 280/735 |
| 6,224,131 B1 | 5/2001 | Shammout | 296/68.1 |
| 6,227,597 B1 | 5/2001 | Swann et al. | 296/68.7 |
| 6,254,164 B1 | 7/2001 | Kawamura et al. | 296/68.1 |
| 6,186,574 B1 | 2/2002 | Motozawa et al. | 296/68.1 |

FOREIGN PATENT DOCUMENTS

| | | |
|---|---|---|
| JP | 5-246252 | 9/1993 |
| JP | 5246253 | 9/1993 |
| JP | 7-101354 | 4/1995 |
| JP | 7-205733 | 8/1995 |
| JP | 2000-62556 | 2/2000 |
| WO | WO 94/22692 | 10/1994 |
| WO | WO 98/40238 | 9/1998 |

* cited by examiner

VEHICLE OCCUPANT PROTECTION SYSTEM

TITLE OF THE INVENTION

VEHICLE OCCUPANT PROTECTION SYSTEM

TECHNICAL FIELD

The present invention relates to a vehicle occupant protection system, and in particular to a vehicle occupant protection system which can reduce a deceleration acting upon a vehicle occupant at the time of a vehicle crash.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants by properly selecting the deformation of the remaining part of the vehicle body, and preventing the former part of the vehicle body from deforming (see Japanese patent laid open publication No. 7-101354, for instance).

However, it may be difficult to reduce the deceleration of the vehicle occupant in the case of small cars which do not provide adequate deformation strokes of the parts of the vehicle body other than the part occupied by the vehicle occupant only with such conventional approaches which essentially consist of attempts to reduce the deceleration of the passenger compartment by controlling the deformation mode of the vehicle body.

Further, it is generally impossible to integrally attach a vehicle occupant to a vehicle body even if the seat is fixedly attached to the vehicle body because the seat belt for restraining the vehicle occupant to the seat has an inevitable slack. Thus, when a vehicle crash occurs, the forward inertial force acting upon the vehicle occupant at the time of a vehicle crash starts rising only after the vehicle occupant is fully restrained by the seat belt. Further, because the seat belt inevitably has a certain resiliency, the deceleration acting on the vehicle occupant, who tends to continue to move forward, reaches a maximum level when the maximum elongation of the seat belt takes place. The maximum deceleration level increases as the forward movement of the vehicle occupant with respect to the vehicle body under the inertial force increases, and is known to substantially exceed the average deceleration of the vehicle body. Therefore, in order to minimize the impact which the vehicle occupant receives at the time of a vehicle crash, it is necessary to minimize the time delay in the rise in the deceleration of the vehicle occupant with respect to the deceleration of the vehicle body and thereby reduce the forward movement of the vehicle occupant with respect to the vehicle body.

Proposals have been made in copending US patent application Ser. Nos. 09/377,366 and 09/376,888 both filed on Aug. 18, 1999, to impart a relative deceleration and acceleration to the vehicle seat or the member carrying the vehicle seat with respect to the main part of the vehicle body so that the vehicle occupant may experience a deceleration from an early stage of a vehicle crash, and the maximum vehicle occupant deceleration may be reduced by distributing the inertia force acting on the vehicle occupant over a longer period of time. The contents of these applications are hereby incorporated in this application by reference.

BRIEF SUMMARY OF THE INVENTION

In view of such problems of the prior art and the recognition by the inventors, a primary object of the present invention is to provide a vehicle occupant protection system which allows the peak deceleration acting upon a vehicle occupant at the time of a vehicle crash to be minimized for a given deformation stroke of the vehicle body.

A second object of the present invention is to provide a vehicle occupant protection system which allows the deceleration acting upon the vehicle occupant at the time of a vehicle crash to be spread over time so as to minimize the peak deceleration acting upon the vehicle occupant.

A third object of the present invention is to provide a vehicle occupant protection system which allows the peak deceleration acting upon the vehicle occupant to be minimized even though the size of the vehicle body is limited.

A fourth object of the present invention is to provide a vehicle occupant protection system which is simple in structure, and light in weight.

A fifth object of the present invention is to provide a vehicle occupant protection system which can be adjusted easily to achieve a preferable deceleration pattern of the seat for minimizing the peak deceleration of the vehicle occupant.

According to the present invention, these and other objects can be accomplished by providing a vehicle occupant protection system, comprising: a seat (8) which is fitted with a seat belt (9) for restraining a vehicle occupant in the seat; a first member (2) attached to the seat and supported on a vehicle body so as to be movable in a direction of an input crash load resulting from a vehicle crash, the first member being adapted to deform under the crash load while supporting an inertial force of said seat upon occurrence of the vehicle crash; a second member (1) which is connected to a main part of the vehicle body and adapted to deform under the crash load while supporting an inertial force of the vehicle body; and a power actuator (10) for applying a forward force to said first member relative to said second member with a certain time delay after the occurrence of the vehicle crash, the first member being adapted to substantially deform only after said forward force is applied to said first member by said power actuator upon occurrence of the vehicle crash.

Because the second member deforms upon the occurrence of a vehicle crash while the first member resists deformation during an initial phase of the crash, the restraining capability of the seat belt is enhanced by applying to the seat a deceleration higher than the vehicle body deceleration during the initial phase of the vehicle crash. Thereafter, a forward force (and thus, opposite in direction to the crash load) is applied to the seat so that the forward inertial force acting on the vehicle occupant is canceled, and the equalization of the decelerations of the vehicle body and the vehicle occupant is achieved in an early stage of the crash.

In one embodiment, the power actuator preferably comprises a cylinder (11), a piston (2*a*) received in said cylinder to define an enclosed chamber in cooperation with said cylinder, and a propellant (12) which is received in said chamber and adapted to produce a high pressure gas upon ignition. In this way, by igniting the propellant to apply a forward force to the first member which is connected to the seat at an appropriate timing, a desirable time history of the deceleration of the seat for minimizing the peak deceleration of the vehicle occupant restrained in the seat can be achieved.

Preferably, a stopper (2*c*, 11*a*) is provided between said first and second members for joining said two members integral to each other following a prescribed rearward displacement of said first member relative to said second member upon occurrence of the vehicle crash, and said power actuator is provided with a vent valve (2d, 11b) for expelling said high pressure gas from said chamber when said first member has been joined with said second member by said stopper. In this way, after application of the forward force to the first member by the high pressure gas, an integral deceleration of the first and second members can be preferably achieved without being affected by the high pressure gas in the chamber of the cylinder.

In view of simplifying the system configuration and manufacturing process, it may be preferable if said stopper is provided between a part (2c) of said piston and an end (11a) of said cylinder, and said vent valve is formed between a part of said piston and said cylinder.

Further, the system preferably comprises a detector (14) for detecting a prescribed rearward displacement of said first member relative to said second member upon occurrence of the vehicle crash, and an igniter (13) for igniting said propellant according to a signal from said detector. The detector may consist of a limit switch (14) or a pressure sensor for detecting a pressure increase inside said cylinder resulting from said prescribed rearward displacement of said first member relative to said second member upon occurrence of the vehicle crash.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
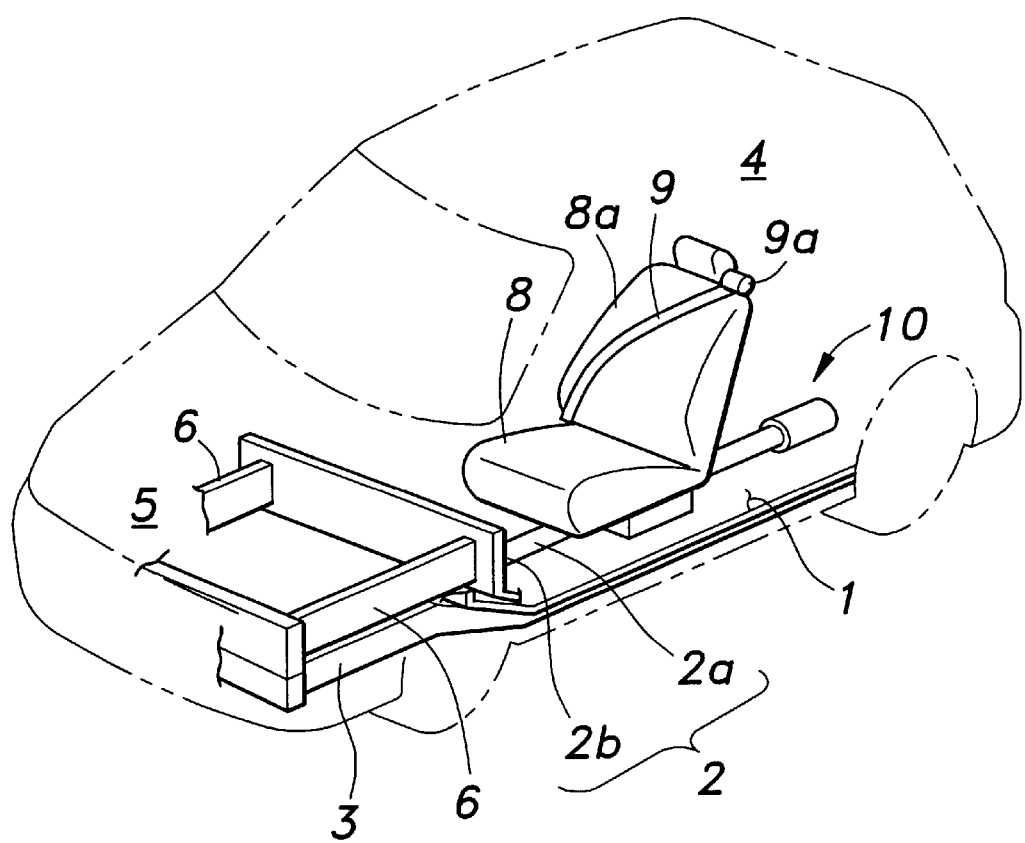
FIG. 1 is a perspective view of an essential part of an automotive vehicle body embodying the present invention.
Figure 2:
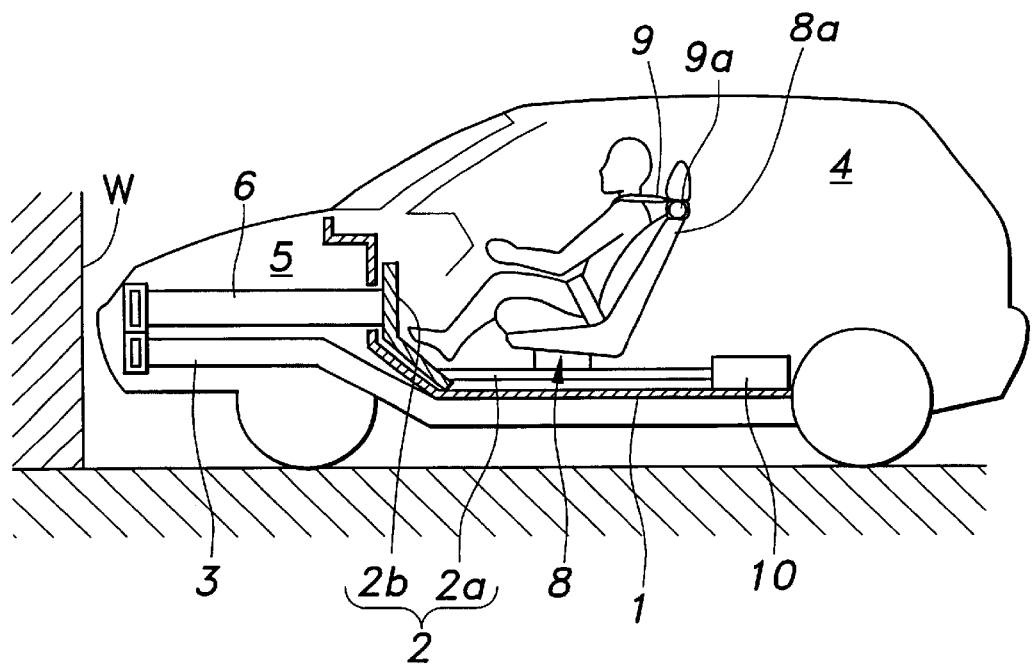
FIG. 2 is a side view of an essential part of the vehicle body.

FIG. 1 is a perspective view showing an essential part of an automotive vehicle body embodying the present invention. As shown in this drawing, a movable part 2 serving as a first member is placed on a main frame 1 serving as a second member in such a manner that the movable part 2 can move with respect to the main frame 1 in a direction of an input crash load when a vehicle crash takes place. As shown in FIG. 2 also, the main frame 1 is integrally attached to an upper surface of a pair of first side beams 3 extending from the front end to the rear end of the vehicle body on either side of the vehicle body to serve as an energy absorbing part, and comprises a floor section of a passenger compartment 4 and a front section extending upward from the floor section to the lower edge of the front windshield at the boundary between the passenger compartment 4 and a bonnet room 5.

The movable part 2 comprises a rod portion (or piston) 2a extending in the fore-and-aft direction of the vehicle body and provided on the floor section of the main frame 1, and an upright portion 2b extending upward from a forward end of the rod portion 2a. A pair of second side beams 6 integrally extend from the front side of the upright portion 2b. The second side beams 6 extend in the fore-and-aft direction of the vehicle body substantially in parallel with the first side beams 3, and have forward ends which substantially align with the forward ends of the first side beams 3. The second side beams 6 are designed such that they are less deformable than the first side beams 3 in the event of a vehicle crash.

A seat 8 is mounted on the rod portion 2a of the movable part 2, and is fitted with a seat belt 9 as a restraint system. The seat belt 9 is provided with a shoulder anchor point 9a which is attached to an upper end portion of a seat back 8a. A support structure consisting of rails and sliders is provided between the seat 8 and the floor part of the main frame 1 to allow the fore-and-aft movement of the seat 8 although it is not shown in the drawings.

Figure 3:
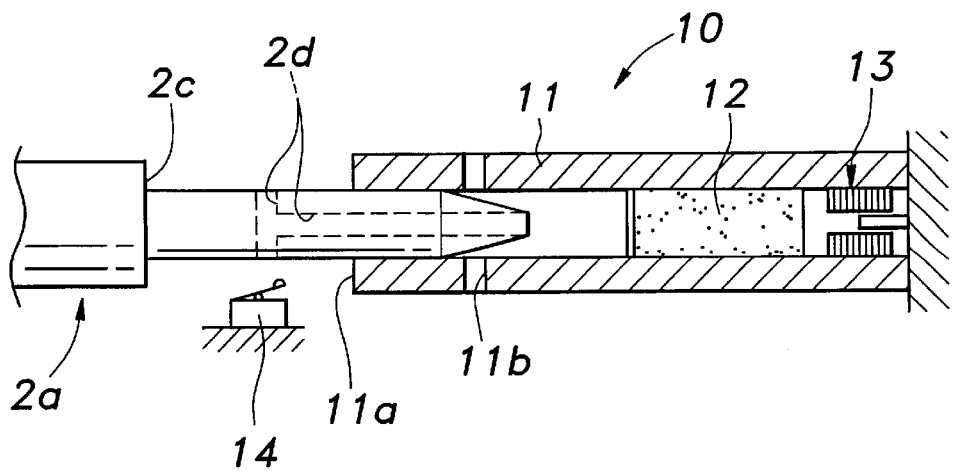
FIG. 3 is an enlarged sectional view of the power actuator consisting of a piston and cylinder assembly.

As shown in FIG. 3, the free end of the rod portion 2a of the movable part 2 is fitted into a cylinder 11 of a high pressure gas generating device 10 serving as a power actuator. The cylinder 11 is fixedly attached to the main frame 1. A propellant 12 is placed in an innermost part of the cylinder 11 for producing a high pressure gas by being ignited by an igniter (or fuse) 13 which may be activated upon detection of a prescribed rearward displacement of the movable part 2 relative to the main frame 1 with a limit switch 14 for example. The high pressure gas produced from the propellant 12 applies a forward thrust to the rod portion 2a of the movable part 2, and thus gives a forward acceleration to the movable part 2 with respect to the main frame 1. A shoulder portion 2c is formed in an intermediate part of the rod portion 2a, and the abutting of the shoulder portion 2c onto an open end 11a of the cylinder 11 determines the limit of the rearward movement of the rod portion 2a or the movable part 2. Thus, the shoulder portion 2c and the open end 11a function as a stopper for limiting the rearward movement of the movable part 2 relative to the main frame 1. A T-shaped hole 2d formed in the rod portion 2a and a hole 11b provided in the side wall of the cylinder 11 jointly form a vent valve for allowing the high pressure gas generated from the high pressure gas generating device 10 to be vented in a later part of an intermediate phase of a vehicle crash, as described in more detail hereinafter.

Now, the mode of operation of the system of the present invention is described in the following with respect to a case of a frontal crash onto a fixed structure W with reference to FIGS. 4 to 7 as well as FIG. 8 which shows desirable deceleration patterns of the seat (solid line) and of the vehicle occupant (broken lines), with the seat deceleration being measured at the shoulder anchor point 9a.

Figure 4A:
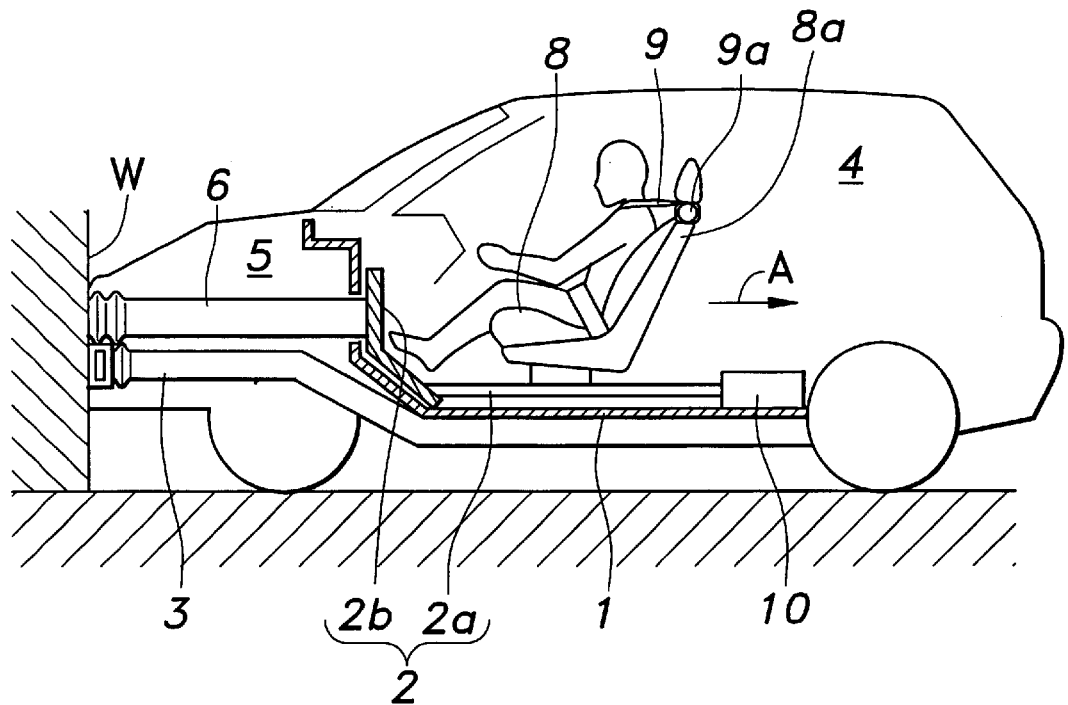
FIG. 4a is a view similar to FIG. 2 showing an initial phase of a vehicle crash.
Figure 4B:
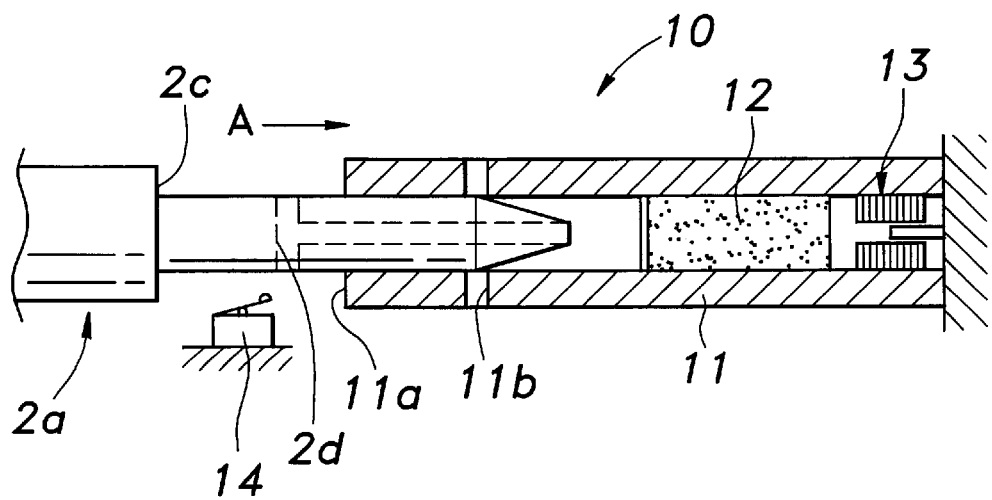
FIG. 4b is a view similar to FIG. 3 in the initial phase of the vehicle crash.
Figure 8:
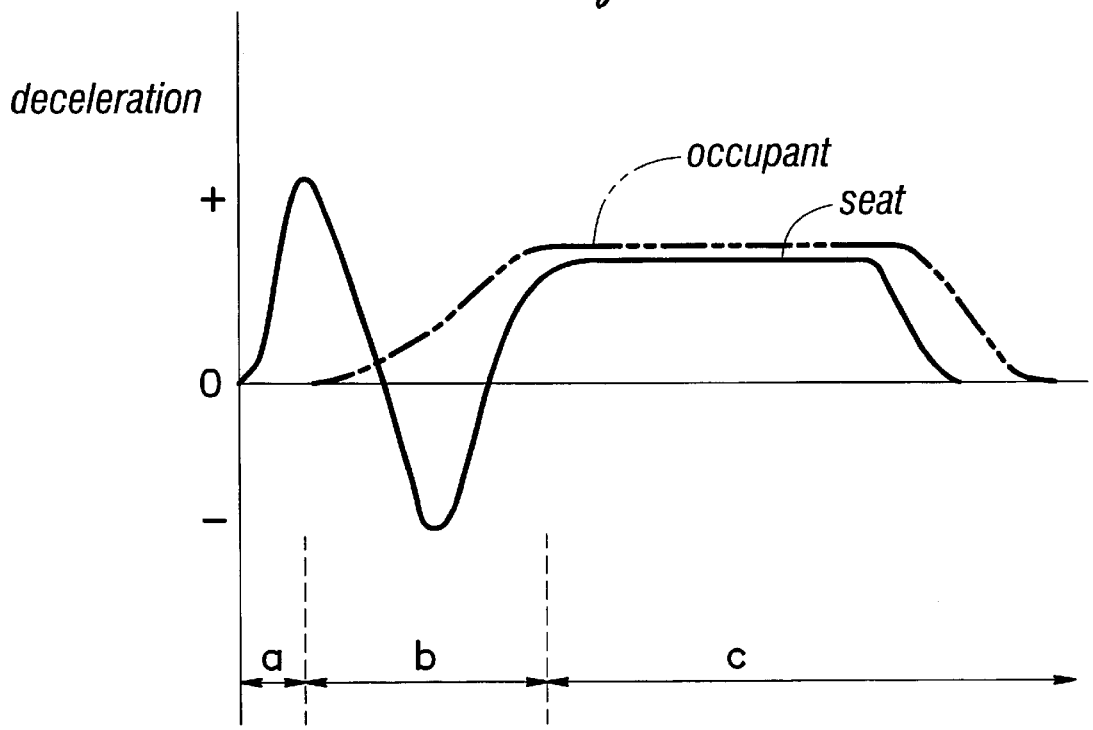
FIG. 8 is a graph showing a desirable time history of the decelerations of the seat and the vehicle occupant.

FIG. 4a is a side view similar to FIG. 2 and shows an initial phase of a crash (the interval "a" in FIG. 8). As the vehicle crashes onto an object W, the front panel section of the outer body shell collapses, and the projecting front ends of the first side beams 3 and the second side beams 6 crash onto the object W immediately thereafter. The first side beams 3 collapse, producing a prescribed deceleration to the main frame 1, while the second side beams 6 which form the moveable part 2 experience less deformation than the first side beams 3, causing the moveable part 2 to start decelerating earlier at a deceleration level which builds up rapidly and sharply (solid line in FIG. 8) than the main frame 1. As a result, the moveable part 2 apparently moves rearward (as indicated by arrow A in FIGS. 4a and 4b) relative to the main frame 1 which continues to move forward due to the compressive deformation of the first side beams 3. Under this condition, the vehicle occupant tends to continue to move forward under the inertial force, but because the seat 8 which is integral with the moveable part 2 instantly moves rearward with respect to the main frame 1, the restraining force of the seat belt 9 on the vehicle occupant increases, and the forward movement of the vehicle occupant is restrained. FIG. 4b illustrates the positional relationship between the rod portion 2a of the moveable part 2 and the high pressure gas generating device 10 in the initial phase of the vehicle crash.

Figure 5A:
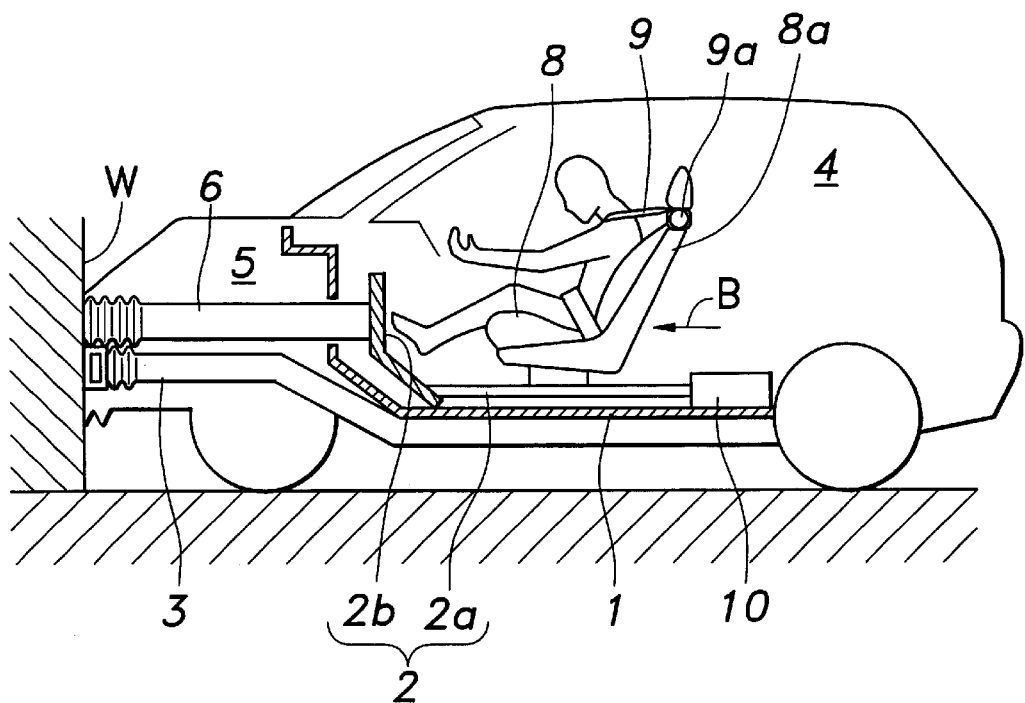
FIG. 5a is a view similar to FIG. 2 showing an earlier part of an intermediate phase of the vehicle crash.
Figure 5B:
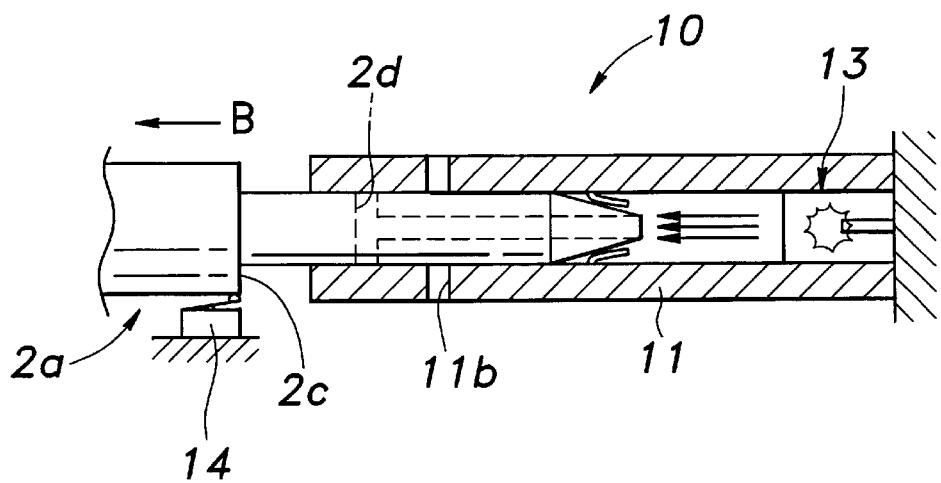
FIG. 5b is a view similar to FIG. 3 in the earlier part of the intermediate phase of the vehicle crash.

In an earlier part of an intermediate phase (the interval "b" in FIG. 8) of the crash illustrated in FIG. 5a, the rod portion 2a of the moveable part 2 is pushed into the cylinder 11 of the high pressure gas generating device 10 by a prescribed distance as illustrated in FIG. 5b, and this is detected by the limit switch 14 which in turn provides an appropriate signal to the igniter 13 to ignite the propellant 12, and thereby produce a high pressure gas. As a result, the rod portion 2a is pushed back with respect to the vehicle body, and the moveable part 2 (and the seat 8 also) is subjected to an opposite deceleration or a forward acceleration (as indicated by arrow B in FIG. 5a and 5b). This state of deceleration in the direction of the progress of the crash appears as the negative deceleration in FIG. 8, and this reverse deceleration of the seat 8 urges the vehicle occupant toward the seat back 8a of the seat 8 or functions to cancel the forward inertia force acting on the vehicle occupant.

It should be noted that the prescribed rearward displacement of the moveable part 2 with respect to the main frame 1 may be detected by any other appropriate detector than the limit switch 14, such as a pressure sensor for detecting a prescribed increase of the pressure inside the cylinder 11 resulting from the prescribed rearward displacement of the moveable part 2 relative to the main frame 1 (or more precisely, resulting from the progress of the rod portion 2a of the moveable part 2 into the cylinder 11). It may be also possible to use a fuse adapted to be activated by a prescribed high pressure development inside the cylinder 11 as the igniter 13, and omit the limit switch 14 to thereby simplify the configuration. However, using a detector such as the limit switch 14 may be preferable in view of easy adjustment of the deceleration pattern of the seat depending on various conditions such as vehicle types or usage, since the ignition timing of the propellant 12 can be easily adjusted by varying the position of the limit switch 14 on the main frame 1.

Figure 6A:
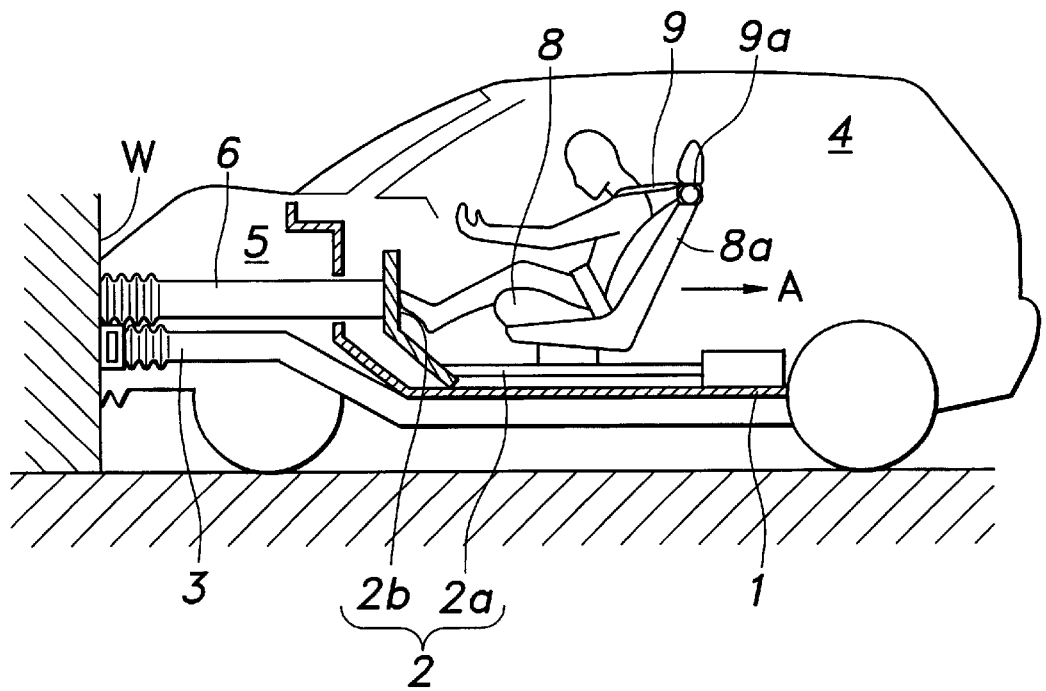
FIG. 6a is a view similar to FIG. 2 showing a later part of the intermediate phase of the vehicle crash.
Figure 6B:
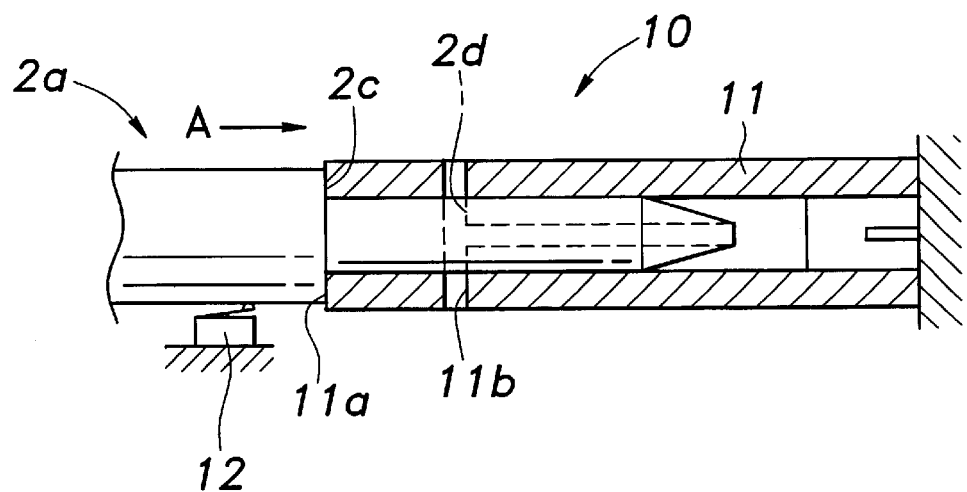
FIG. 6b is a view similar to FIG. 3 in the later part of the intermediate phase of the vehicle crash.

In a later part of the intermediate phase of the crash illustrated in FIG. 6a, the thrust by the high pressure gas is overcome by the force acting upon the front portion of the moveable part 2, and accordingly the moveable part 2 is again moved in the rearward direction with respect to the main frame 1 (as indicated by arrow A in FIGS. 6a and 6b) and the deceleration level of the moveable part 2 progressively increases. The shoulder portion 2c of the moveable part 2 eventually abuts the open end 11a of the cylinder 11 (FIG. 6b), thereby preventing any further rearward movement of the moveable part 2 relative to the main frame 1 so that the moveable part 2 and the main frame 1 jointly decelerate. The high pressure gas inside the cylinder 11 is vented from the gas vent hole 2d of the rod 2a and the gas vent hole 11b of the cylinder 11 serving as a vent valve. Since the high pressure gas is vented through the gas vent holes 2d and 11b, it can be prevented that the high pressure gas inside the cylinder 11 undesirably affects the integral deceleration of the moveable part 2 and the main frame 1.

Figure 7:
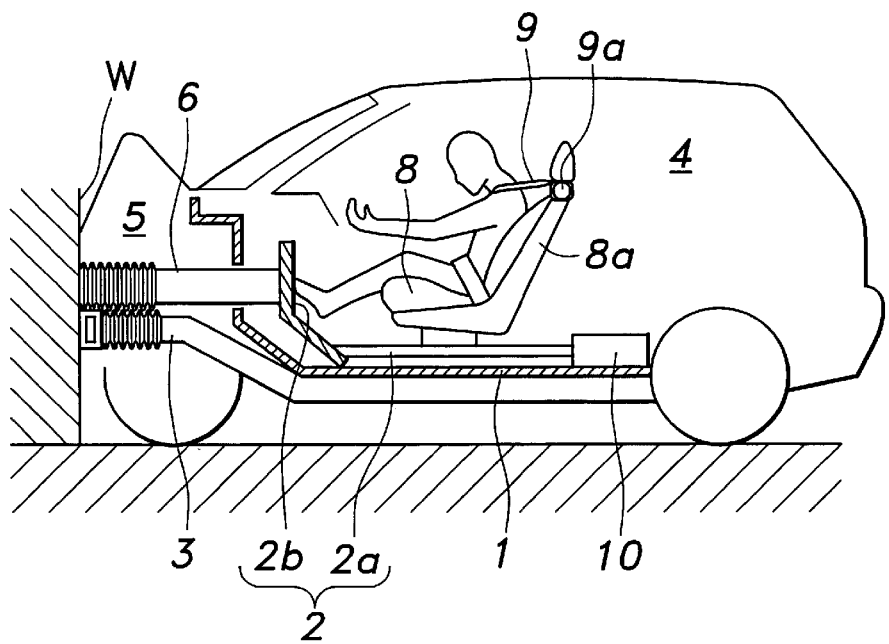
FIG. 7 is a view similar to FIG. 2 showing a final phase of the vehicle crash.

In a final phase of the crash illustrated in FIG. 7, the moveable part 2 (and hence the seat 8) is integral with the main frame 1 and the restraining load of the seat belt 9 balances out with the deceleration level of the seat 8, and thus the vehicle occupant is in a so-called "ride down state" with respect to the vehicle body, or the vehicle body deceleration and the vehicle occupant deceleration are substantially equal to each other (the interval "c" in FIG. 8). This state is maintained until the vehicle body comes to a complete stop. In this phase, the first side beams 3 and the second side beams 6 both progressively collapse at the same time, and jointly absorb the impact energy while decelerating the vehicle body.

The deformation of the vehicle body at the time of a vehicle crash progresses as described above, and the favorable time history of the seat deceleration and the vehicle occupant deceleration as shown in FIG. 8 can be achieved. Since a power actuator (high pressure gas generating device 10) is used to provide a forward acceleration to the moveable part 2 (or seat 8), the degree and duration of the acceleration can be easily adjusted for example by changing the amount of propellant 12, which facilitates the optimization of the time history of the seat deceleration and the vehicle occupant deceleration.

A passenger automobile is typically fitted with a pair of seats 8 which are arranged on either side of the vehicle body. In such a case, the two seats 8 may be mounted on separate moveable parts 2 each connected to an associated high pressure gas generating device 7, and the two seats 8 may not be joined integrally to each other.

As can be appreciated from the foregoing description, according to the present invention, the seat is subjected to a deceleration greater than an average deceleration in an early stage of a vehicle crash by causing a moveable part which is moveable in the fore-and-aft direction with respect to the vehicle body and is connected to the seat to move in a rearward direction, and, after a certain time delay, a negative deceleration (acceleration) is temporarily produced in the seat by applying a forward acceleration to the moveable part with a power generating device before the entire vehicle body finally decelerates at the average deceleration. Thus, a vehicle body (seat) deceleration waveform which is favorable for the deceleration of the vehicle occupant can be achieved, and the peak of the vehicle occupant deceleration can be substantially reduced with a smaller vehicle body deformation (dynamic stroke) than has been hitherto possible. Also, because this can be accomplished with a simple arrangement, a compact design of the vehicle body is possible.

The displacement of the vehicle occupant in the passenger compartment (with respect to the vehicle body) can be reduced even further than the arrangement in which a restraint system is fitted with a load limiter to reduce the vehicle occupant deceleration, and thus the possibility of secondary crashes is also reduced.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant protection system, comprising:
   a seat which is fitted with a seat belt for restraining a vehicle occupant in the seat;
   a first member attached to the seat and supported on a vehicle body so as to be slidable in a direction of an input crash load resulting from a vehicle crash, the first member being adapted to deform under the crash load while supporting an inertial force of said seat upon occurrence of the vehicle crash;
   a second member which is connected to a main part of the vehicle body and adapted to deform under the crash load while supporting an inertial force of the vehicle body; and
   a power actuator for applying a forward force to said first member relative to said second member with a certain time delay after the occurrence of the vehicle crash,
   the first member being adapted to substantially deform only after said forward force is applied to said first member by said power actuator upon occurrence of the vehicle crash.

2. A vehicle occupant protection system according to claim 1, wherein said power actuator comprises a cylinder, a piston received in said cylinder to define an enclosed chamber in cooperation with said cylinder, and a propellant which is received in said chamber and adapted to produce a high pressure gas upon ignition.

3. A vehicle occupant protection system according to claim 2, wherein a stopper is provided between said first and second members for joining said two embers integral to each other following a prescribed rearward displacement of aid first member relative to said second member upon occurrence of the vehicle crash, and said actuator is provided with a vent valve for expelling said high pressure gas from said chamber when said first member has been joined with said second member by said stopper.

4. A vehicle occupant protection system according to claim 3, wherein said stopper is provided between a part of said piston and an end of said cylinder, and said vent valve is formed between a part of said piston and said cylinder.

5. A vehicle occupant protection system according to claim 2, further comprising a detector for detecting a prescribed rearward displacement of said first member relative to said second member upon occurrence of the vehicle crash, and an igniter for igniting said propellant according to a signal from said detector.

6. A vehicle occupant protection system according to claim 5, wherein said detector comprises a limit switch.

7. A vehicle occupant protection system according to claim 5, wherein said detector comprises a pressure sensor for detecting a pressure increase inside said cylinder resulting from said prescribed rearward displacement of said first member relative to said second member upon occurrence of the vehicle crash.

8. A vehicle occupant protection system according to claim 2, wherein a stopper is provided between said first and second members for joining said two members integral to each other following a first prescribed rearward displacement of said first member relative to said second member upon occurrence of the vehicle crash, and said actuator is provided with a vent valve for expelling said high pressure gas from said chamber when said first member has been joined with said second member by said stopper, and wherein
   said system further comprises:
   a detector for detecting a second prescribed rearward displacement of said first member relative to said second member upon occurrence of the vehicle crash, said second prescribed rearward displacement being smaller than said first prescribed rearward displacement; and
   an igniter for igniting said propellant according to a signal from said detector.

* * * * *